United States Patent [19]
Linner

[11] Patent Number: 5,305,583
[45] Date of Patent: Apr. 26, 1994

[54] METHOD AND APPARATUS FOR CONTROLLING THE TEMPERATURE OF A CONTAINER END PORTION DURING MANUFACTURE

[75] Inventor: Hans Linner, Kalmar, Sweden

[73] Assignee: Norden Pac Development AB, Sweden

[21] Appl. No.: 916,858

[22] PCT Filed: Feb. 20, 1991

[86] PCT No.: PCT/SE91/00124
§ 371 Date: Aug. 6, 1992
§ 102(e) Date: Aug. 6, 1992

[87] PCT Pub. No.: WO91/14624
PCT Pub. Date: Oct. 3, 1991

[30] Foreign Application Priority Data
Mar. 26, 1990 [SE] Sweden ................... 9001086

[51] Int. Cl.$^5$ ............... B65B 7/28; B65B 51/20; B65B 51/32
[52] U.S. Cl. ................ 53/478; 53/329.2; 53/329.3; 156/69
[58] Field of Search ........... 53/329.2, 329.3, 373.9, 53/478, 489, 319; 156/69; 414/108, 102, 215

[56] References Cited
U.S. PATENT DOCUMENTS

| | | | |
|---|---|---|---|
| 3,102,182 | 8/1963 | Oelze et al. | 53/329.3 |
| 3,239,397 | 3/1966 | Hoyle | 53/329.3 X |
| 3,449,183 | 6/1969 | Zelnick | 53/329.3 X |
| 3,604,615 | 9/1971 | Barreman | 53/489 X |
| 3,849,971 | 11/1974 | Granseus et al. | 53/329.2 |
| 3,962,844 | 6/1976 | Gordon | 53/478 |
| 4,511,426 | 4/1985 | Linner | 53/373.9 |
| 4,659,415 | 4/1987 | Shimokawa et al. | 53/373.9 |
| 4,957,581 | 9/1990 | Jahrig et al. | 53/373.9 |
| 4,982,555 | 1/1991 | Ingemann | 53/473 X |

FOREIGN PATENT DOCUMENTS

| | | |
|---|---|---|
| 359479 | 9/1973 | Sweden . |
| 379003 | 9/1979 | Sweden . |
| 8704048-1 | 4/1989 | Sweden . |
| 8800548-3 | 8/1989 | Sweden . |

Primary Examiner—Horace M. Culver
Attorney, Agent, or Firm—Lerner, David, Littenberg, Krumholz & Mentlik

[57] ABSTRACT

Disclosed is a method and apparatus for controlling the temperature of a container end portion during manufacture, said container being filled with a product 11, and comprising a substantially tubular body portion 10 of thin-walled plastic or laminated plastic material and a butt-weldable end-piece 13 at each end of the body portion, whereby a first end-piece is fitted to one end of the body portion and the product 11 is introduced into the container via the open end of the body portion, a second end-piece 13 is introduced into the said open body portion end to an intermediate position where it partially projects into the body portion 10, and the plastic material of the body portion end region and the second end-piece is softened through application of heat energy, characterized in that the end-piece 13, by means of relative displacement between it and the body portion 10, is pressed in to the body portion to its terminal position whilst cooling gas is supplied to the transverse wall 15 of the end-piece 13.

12 Claims, 2 Drawing Sheets

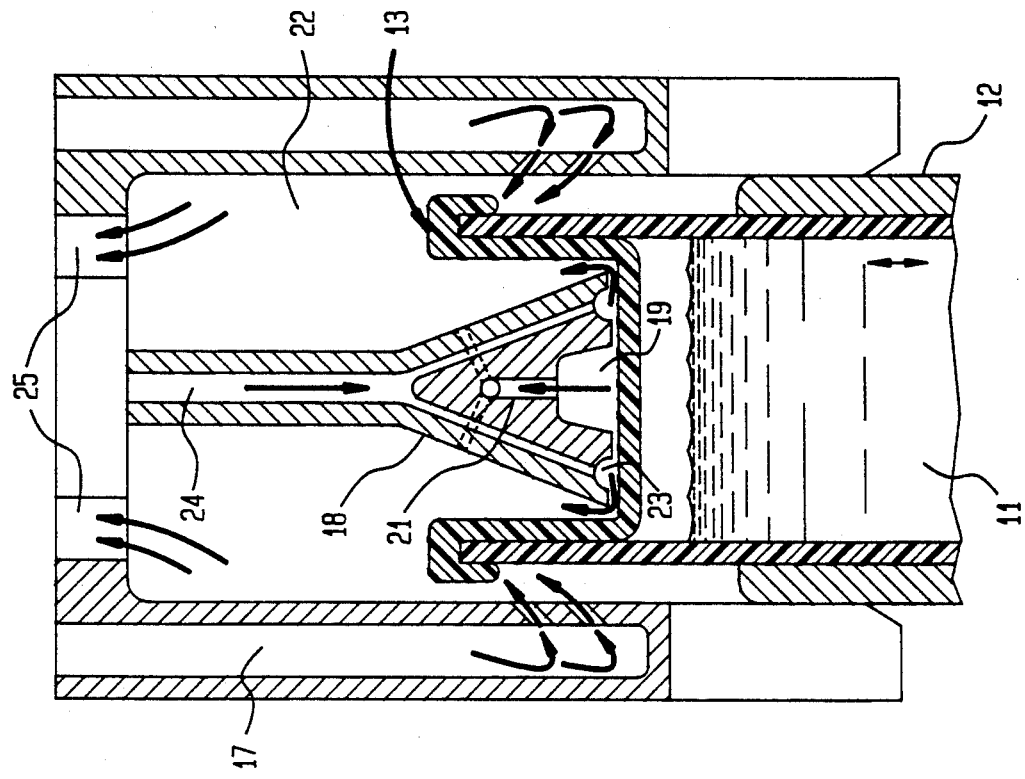
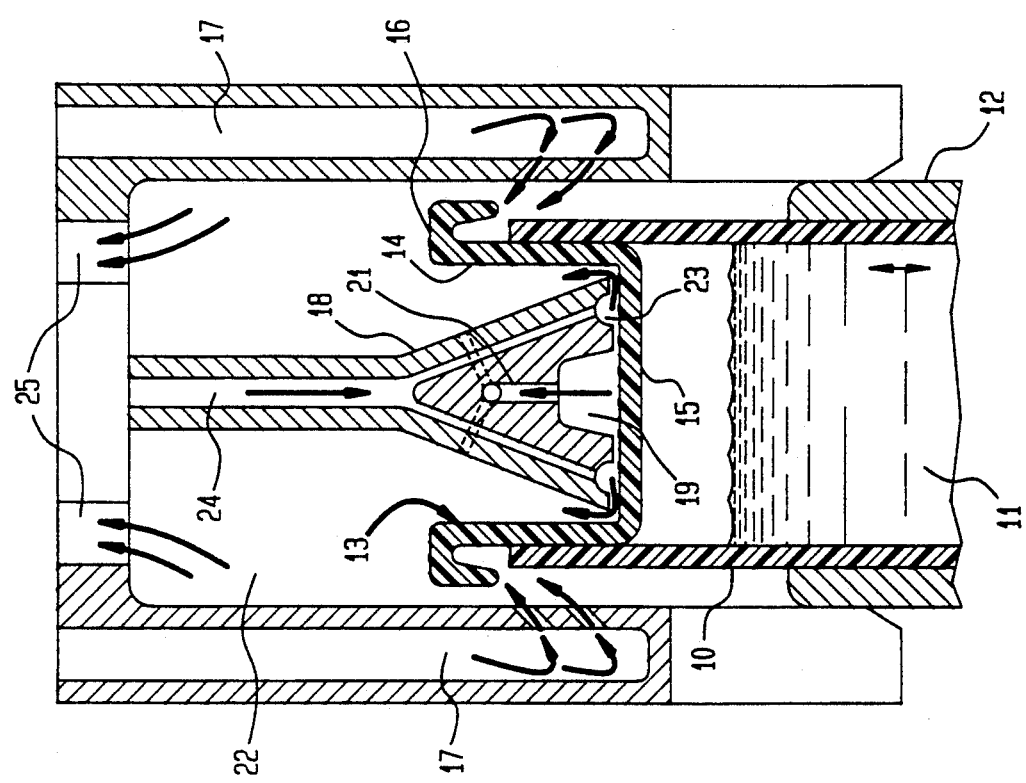

METHOD AND APPARATUS FOR CONTROLLING THE TEMPERATURE OF A CONTAINER END PORTION DURING MANUFACTURE

TECHNICAL FIELD

The present invention relates to a method and apparatus for controlling the temperature of a container end portion during manufacture.

BACKGROUND

Tubes and bottles made from thin-walled plastic or plastic laminated material are used for packaging of, for example, creams, ointments and various other viscous chemical/engineering preparations. Swedish Patent Application 8800548-3 describes an end-piece and a method for manufacturing tubes or bottles by butt-welding an end-piece in both ends of a tubular-shaped body portion of thin-walled plastic or laminated plastic material.

The advantage of manufacturing tubes or bottles in this way is that the need to transport bulky empty containers over long distances is avoided. Accordingly the method allows the private packager to produce his own tubes or bottles without comprehensive equipment.

The tube or bottle produced according to the above method can be filled with its product via its opening, after which a cap is affixed over the opening with the aid of, for example, screw threads.

In many cases, however, it is desirable to provide a container which has been sealed in a controlled environment so that the customer can confirm that the packaging is unopened. This results in enhanced quality, both for the packaging and its contents.

During production of such a sealed container it is advantageous that filling with the product occurs between the fitting of the first end-piece, preferably tubularly formed, and the second end-piece.

In the method according to said Swedish Patent Application 8800548.3 tubular-shaped body portions are located on a rotary indexing table for movement between various stations. At one station each end-piece is introduced into the upper end of a corresponding body portion by a piston to an intermediate position where it partially projects into the body portion. This partially assembled work piece is then moved to the next station where heating energy is supplied to the circumferential end region of the tube and intersecting region of the end piece. Once a temperature is attained at which the material is sufficiently soft, the work piece is advanced to the subsequent station where a piston is reapplied to push the end piece to its terminal position. Rapid cooling of the welding site is then achieved by means of passages within the piston for a cooling fluid.

SUMMARY OF THE INVENTION

Up until now it has proved impossible to apply the end-piece with the piston in situ during heating since the rim of the end-piece upon which the piston acts is subjected to heating to between 300° C.-500° C., thereby softening the material and causing it to adhere to the piston.

The object of the present invention is thus to provide a method and an apparatus which permits the production of filled containers at a high rate whilst avoiding the above-mentioned problem.

This object is achieved according to the invention by a method for manufacturing a container by sealing an end-piece having a transverse wall portion and a peripheral portion to an open end portion of the container, the method comprising the steps of:

introducing the end-piece into the open end portion of the container to an intermediate position such that the end-piece partially projects into the open end portion;

heating the open end portion and the peripheral portion of the end-piece so as to soften the open end portion and the peripheral portion, and displacing the transverse wall portion of the end-piece to its terminal position relative to the open end portion while simultaneously cooling the transverse wall portion of the container.

The present invention also provides an apparatus for manufacturing a container by sealing an end-piece having a transverse wall and a peripheral portion to an open end portion of the container, comprising:

displacement means for displacing the transverse wall of the end-piece into the open end portion of the container to an intermediate position relative to the open end portion;

heating means for heating the open end portion and the peripheral portion of the end piece so as to soften the open end portion and the peripheral portion; and cooling means for cooling the transverse wall while simultaneously displacing the transverse wall of the end-piece to its terminal position relative to the open end portion.

Preferred methods and embodiments of the apparatus according to the invention are given in the respective dependent claims.

Since, according to the invention, the abutment means acts on the transverse wall of the end-piece which is not subjected to direct heating, and cooling gas is supplied thereto, there is no tendency for the abutment means to adhere to the end-piece.

BRIEF DESCRIPTION OF THE DRAWINGS

The invention will be described in more detail in the following, with reference to the drawings in which FIGS. 1 and 2 schematically show the application of an end-piece to a tubular body portion in two steps with apparatus according to the invention.

DETAILED DESCRIPTION OF THE PREFERRED EMBODIMENT

Figure 3:
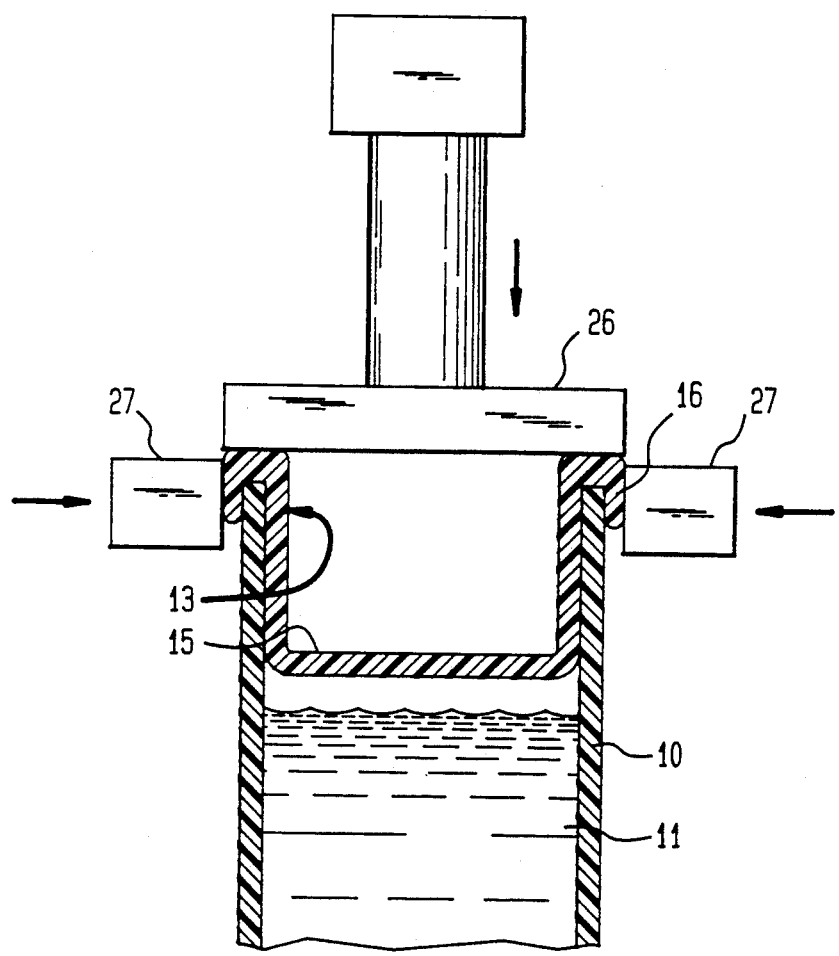
FIG. 3 shows the compression of the weld-seam.

The flattenable tubular body portion 10 shown in the drawings can be made from a single-layer plastic material or from a laminate comprising a metal foil which provides the body portion with better barrier properties. The body portion can be produced by a foil butt-seam welder or, alternatively, from an extruded tube, cut to the appropriate length. Such body portions normally have a wall thickness well under 1 mm.

In the drawings only the upper end of the body portion is shown. The lower part of the body portion is already fitted with an end-piece in the form of, for example, a discharge outlet with cooperating screw cap. The body portion is filled via its open end with a product 11 to a predetermined level which corresponds to the desired quantity for the container. The body portion is now placed vertically with the opening upwards in a cylindrical holder 12 in a (not shown) rotary indexing table which is provided with means for fitting the end-piece in the following sequence of steps.

In FIG. 1 the end-piece 13 has been partially introduced into the upwardly open body portion end and then advanced one stage to the welding station shown in FIGS. 1 and 2.

The end-piece 13 comprises an insert section 14 which, on the inner end, is provided with a transverse wall 15 and, on the other end, is provided by a U-shaped section 16. The insert section 14 tapers inwardly towards the transverse wall 15. The U-shaped section is provided with a groove that tapers towards the bottom of the U-shaped section.

The end-piece can, by way of example, be produce by injection-molding, whereby a barrier foil blank may be included on the inner side or the outer side of the transverse wall 15.

The welding station is provided with passages 17 for supplying hot gas via directed openings to the region of the body portion end edge and to the groove in the U-shaped section 16 in order to soften these regions by application of heat to a temperature between about 300°-500° C. After suitable heating, the holder 12 is displaced upwardly in the welding apparatus so that the end-piece 13 is pressed into the tubular body portion until the rim of the body portion meets with the bottom of the groove, as shown in FIG. 2. A central bell-shaped nozzle head 18 of slightly smaller diameter than the transverse wall 15 serves as an abutment for the end-piece 13.

The nozzle head 18 is formed with a substantially flat underside provided with a central recess 19 and a groove 23 which extends circumferentially above the perimeter of the transverse wall 15. A substantially vertical branch conduit 24 for the supply cooling gas opens into the groove 23 and accordingly distributes cooling gas around the perimeter of the transverse wall 15.

A suitable cooling gas can be cold air. Expended cold air flows from the groove 23 via the underside of the nozzle head to the surrounding space 22 from where the utilized cold air and hot gas is drawn from the welding station via passages 25. In this way the temperature of the transverse wall region which is abutted by the nozzle head is controlled thereby preventing adhesion of the nozzle head thereto. Advantageously the underside of the nozzle head may be coated with a "non-stick" material, such as TEFLON.

FIG. 3 shows the subsequent step of compressing the U-shaped section 16 whilst still soft so that a seal in this region is achieved. Compression can be carried out by a vertically displaceable abutment 26 and a plurality of horizontal compression devices 27. These compression devices may be mechanically or elastic-hydraulically operable.

The invention is not restricted to the above described embodiments, but may be modified within the scope of the appended claims.

I claim:

1. A method for manufacturing a container by sealing an end-piece having a transverse wall portion and a peripheral portion to an open end portion of said container, said method comprising the steps of:
   introducing said end-piece into said open end portion of said container to an intermediate position such that said end-piece partially projects into said open end portion;
   heating said open end portion and said peripheral portion of said end-piece so as to soften said open end portion and said peripheral portion; and
   displacing said transverse wall portion of said end-piece to its terminal position relative to said open end portion while simultaneously cooling said transverse wall portion of said container.

2. A method according to claim 1, where said end-piece comprising a first end piece, and said open end portion of said container comprises a first end portion of said container, and including the step of fitting a second end-piece having a discharge outlet onto said second end portion of said container.

3. A method according to claim 1, further comprising the step of supplying a product to said container through said open end portion.

4. A method according to claim 1, wherein said heating step comprises supplying hot gas to said open end portion and said peripheral portion of said end piece.

5. A method according to claim 1, wherein said simultaneously cooling comprises supplying a cooling gas to said transverse wall portion of said container.

6. A method according to claim 4, further comprising removing said hot gas.

7. A method according to claim 5, further comprising removing said cooling gas.

8. A method according to claim 1, further comprising sealing said peripheral portion of said end-piece to said open end portion of said container.

9. Apparatus for manufacturing a container by sealing an end-piece having a transverse wall and a peripheral portion to an open end portion of said container, comprising:
   displacement means for displacing said transverse wall of said end-piece into said open end portion of said container to an intermediate position relative to said open end portion;
   heating means for heating said open end portion and said peripheral portion of said end piece so as to soften said open end portion and said peripheral portion; and
   cooling means for cooling said transverse wall while simultaneously displacing said transverse wall of said end-piece to its terminal position relative to said open end portion.

10. An apparatus according to claim 9, wherein said cooling means comprises a substantially vertical conduit and a nozzle-head having a diameter slightly smaller than the diameter of said transverse wall, said nozzle head containing a circumferential slot which opens into a ring-shaped groove circumscribing the perimeter of said transverse wall, and further wherein said substantially vertical conduit, said circumferential slot and said ring-shaped groove being in fluid connection with each other.

11. An apparatus according to claim 9, further comprising suction means for removing gases from the area of said transverse wall.

12. An apparatus according to claim 9, further comprising sealing means for sealing said peripheral portion of said end-piece with said open end portion of said container.

* * * * *